(12) United States Patent
Fidric

(10) Patent No.: US 6,621,835 B1
(45) Date of Patent: Sep. 16, 2003

(54) RAMAN AMPLIFIER IN RING CONFIGURATION

(75) Inventor: Bernard G. Fidric, Cupertino, CA (US)

(73) Assignee: JDS Uniphase Corporation, San Jose, CA (US)

(*) Notice: Subject to any disclaimer, the term of this patent is extended or adjusted under 35 U.S.C. 154(b) by 325 days.

(21) Appl. No.: 09/591,779

(22) Filed: Jun. 12, 2000

(51) Int. Cl.[7] ................................................ H01S 3/30
(52) U.S. Cl. ................................ 372/6; 372/3; 372/92; 372/94
(58) Field of Search ........................ 372/3, 6, 92, 94, 372/108

(56) References Cited

U.S. PATENT DOCUMENTS

| | | | | |
|---|---|---|---|---|
| 3,797,911 A | * | 3/1974 | Kogelnik | 350/96 |
| 6,175,436 B1 | * | 1/2001 | Jackel | 359/179 |
| 6,344,925 B1 | * | 2/2002 | Grubb | 359/345 |

* cited by examiner

Primary Examiner—Paul Ip
Assistant Examiner—Armando Rodriguez
(74) Attorney, Agent, or Firm—Kudirka & Jobse, LLP

(57) ABSTRACT

An optical gain device preferably uses stimulated Raman scattering and is in a ring configuration. Fused fiber couplers are used in one embodiment in combination with wavelength selective reflectors to input pump energy to the ring, and to output the desired output wavelengths. The couplers and reflectors are arranged so that the relative phase shifting induced by the couplers allows the optical energy to be directed as desired. The system may also make use of a redirecting reflector at the output wavelength that keeps output light in the ring propagating in the proper direction. A plurality of reflectors may also be used in the ring to select the desired wavelengths at the different Stokes orders being used. In an alternative embodiment, thin film type couplers are used rather than fused fiber couplers. The thin film type couplers may include separate input and output devices, each with its own cutoff wavelength, or a single coupler may include two wavelength selective materials, and accomplish both the input and the output coupling functions. A single wavelength selective coupler is also provided that accomplishes both the input and the output coupling functions.

40 Claims, 9 Drawing Sheets

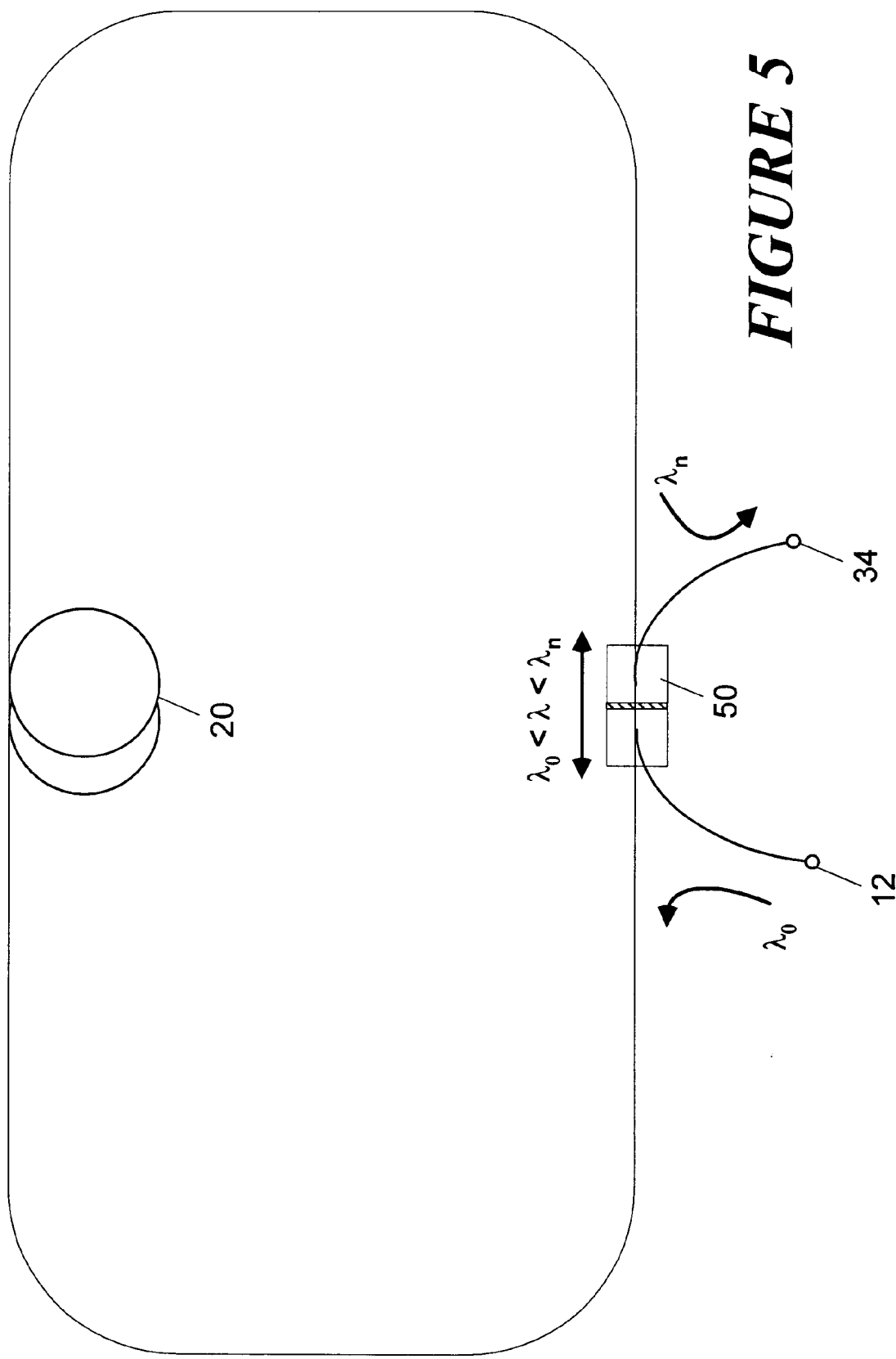

RAMAN AMPLIFIER IN RING CONFIGURATION

FIELD OF THE INVENTION

This invention relates generally to optical gain devices and, more specifically, to optical gain devices using stimulated Raman scattering.

BACKGROUND OF THE INVENTION

An optical gain medium is a device that, when provided with pumping energy, increases the amplitude of a desired optical signal. Optical gain media may be constructed using optical fiber, and used as fiber lasers or fiber-based optical amplifiers. One form of optical gain mechanism known in the art is based on stimulated Raman scattering (SRS). In such a device, optical pumping energy is injected into an optical fiber medium. The optical pumping energy, via SRS, allows for a transfer of optical power to a wavelength longer than the pumping wavelength, due to the excitation of a vibrational mode in the medium that provides gain at the longer wavelength.

The longer wavelengths to which optical power is transferred may be predetermined relative to the wavelength of the pumping energy. Each wavelength shift is referred to as a "Stokes" shift and, since it is a known amount, the resulting wavelength may be selected by proper selection of the pumping wavelength. Some Raman gain media use only a single wavelength shift to produce optical energy at a desired wavelength. In another type of Raman device, overlapping resonant cavities are constructed for a number of shifted wavelengths all based on the same initial pumping wavelength. That is, the shifted wavelength resulting from the pumping wavelength, referred to as the "first Stokes order" is resonated within the gain medium, generating its own shifted wavelength that is a predetermined amount longer than the first order wavelength. This "second order" wavelength is, in turn, resonated within the cavity to generate a "third Stokes order" wavelength. By accurate selection of the different resonant reflectors and the initial pumping wavelength, a number of Stokes shifts may be used to generate an optical signal at a desired wavelength significantly longer than the pumping wavelength. This type of optical device is generally referred to as a "cascaded Raman resonator" (CRR), and an example of such a device is described in U.S. Pat. No. 5,323,404.

SUMMARY OF THE INVENTION

In accordance with the present invention, an optical gain apparatus is provided that includes a gain medium that produces optical gain in response to optical energy at a pump wavelength. In a preferred embodiment, the gain medium provides gain via SRS, and the gain is therefore at a wavelength longer than the pump wavelength. A plurality of fused fiber couplers are used, including one coupled to an input port of the system and one coupled to an output port. The fused fiber couplers each have two signal paths on each of a first side and a second side. Each coupler is arranged such that signals directed to the coupler along the first and second signal paths exit the coupler along the third and fourth signal paths, and vice versa. The first coupler has its first path coupled to an input port and its second path coupled to a first optical side of the gain medium. The second coupler has its fourth path coupled to an output port and its third path coupled to a second optical side of the gain medium.

In the third and fourth signal paths of the first coupler are located input reflectors, each of which is reflective at an input wavelength. Thus, optical energy at the input wavelength that is directed into the first coupler along its first signal path is directed to both input reflectors and, as such, is directed back into the first coupler. These two signal portions are in phase only along the second signal path of the first coupler, and all of the reflected energy is therefore coupled along the second signal path toward the gain medium. Similarly, in the first and second signal paths of the second coupler are located output reflectors, each of which is reflective at an output wavelength. Thus, optical energy at the output wavelength that is directed from the gain medium into the third signal path of the second coupler is directed to both output reflectors and, as such, is directed back into the second coupler. The two signal portions reflected back to the second coupler are in phase only along the fourth signal path, and all of the reflected energy is therefore coupled toward the output port of the system. The optical energy not reflected by the output reflectors is coupled back toward the gain medium.

In the preferred embodiment, the optical gain apparatus is configured as an optical ring, such that the optical energy travels continuously through the ring in one direction until the output wavelength is reached, and the light is reflected by the output reflectors toward the system output port. Light not at the output wavelength bypasses the output reflectors and remains in the ring. In a preferred embodiment, the light that bypasses the output reflectors is coupled through two more fused fiber couplers. This light is then directed toward the input reflectors adjacent to the first coupler, but approaches from the side of the input reflectors opposite the first coupler. This light bypasses the input reflectors and, being at the correct relative phase, is all coupled through the first fused coupler, and out its second signal path toward the first optical side of the gain medium.

In one variation of the invention, a reflector is used in the ring structure that is reflective at the output wavelength. This reflector is positioned so that any light at the output wavelength that is traveling opposite to the desired ring direction is reflected back to the desired direction. In another variation, a plurality of reflectors are used in the ring, each of which has a narrow band reflectivity at a different Stokes order relative to the input wavelength. Thus, when the apparatus is functioning as a CRR, the different reflectors allow the wavelength at each different Stokes order to be selected with precision.

In an alternative embodiment of the invention, a ring configuration is used, but without the fused fiber couplers. The ring includes a Raman gain medium, and operates as a CRR. Wavelength selective couplers, preferably thin film type couplers, are used to couple input optical energy into the ring and to couple output optical energy out of the ring. In the preferred version of this embodiment, the input coupler has a cutoff wavelength, such that wavelengths significantly longer than that of the input optical energy are prevented from passing through the coupler, while the input wavelength passes through unimpeded. Similarly, the output coupler has a cutoff wavelength such that wavelengths significantly shorter than a desired output wavelength are prevented from passing through the coupler, while optical energy at the output wavelength passes out through the coupler to an output port. Shorter wavelengths are maintained in the ring, and continue propagating through the Raman gain medium. The couplers may be arranged such that input and output light is transmitted through the coupler filter elements into and out of the ring, respectively, or they may be arranged so that the input and output light is reflected by the coupler filter elements into and out of the ring. As in aforementioned embodiments, a reflector may be used at the wavelength of the output light to maintain a single direction of propagation through the ring. Likewise, one or more reflectors in the ring may be used to select intermediate Raman wavelengths at the various Stokes orders being used with the system, if the device is being used as a CRR.

In accordance with the invention, a single coupler is provided that accomplishes both the input and the output functions of a thin film type coupler embodiment. This coupler has a pair of graded index (GRIN) lenses separated by a filter element. The filter element includes two separate materials, each of which has a different wavelength filter function. In one embodiment of the invention, the materials are coatings on opposite surfaces of the filter element. A first one of the materials may have a "high-pass" type wavelength characteristic, such that wavelengths at or below a first cutoff wavelength coupled into a first optical path of the coupler are reflected into a second optical path by the first material, while longer wavelengths are transmitted through it. Similarly, the other material may have a "low-pass" type wavelength characteristic, such that wavelengths at or above a second cutoff wavelength coupled into a third optical path of the coupler are reflected into a fourth optical path by the second material. Wavelengths below the second cutoff wavelength that enter along the third optical path are transmitted through the filter element to a desired optical path, such as the second optical path of the coupler. With this arrangement, the filter element has an overall reflectivity characteristic that allows optical energy between the first and second cutoff wavelengths to be trapped within an optical ring, continuously coupled between the third optical path and the second optical path. Meanwhile, optical energy with wavelengths at or below the first cutoff wavelength may be coupled into the ring using the reflectivity of the first material, and optical energy with wavelengths at or above the second cutoff wavelength may be coupled out of the ring using the reflectivity of the second material.

BRIEF DESCRIPTION OF THE DRAWINGS

The above and further advantages of the invention may be better understood by referring to the following description in conjunction with the accompanying drawings in which:

FIG. 5 is a schematic view of an embodiment similar to that of FIG. 4B, but in which a single coupler accomplishes both the input and the output functions of the system.

DETAILED DESCRIPTION OF THE PREFERRED EMBODIMENTS

Figure 1:
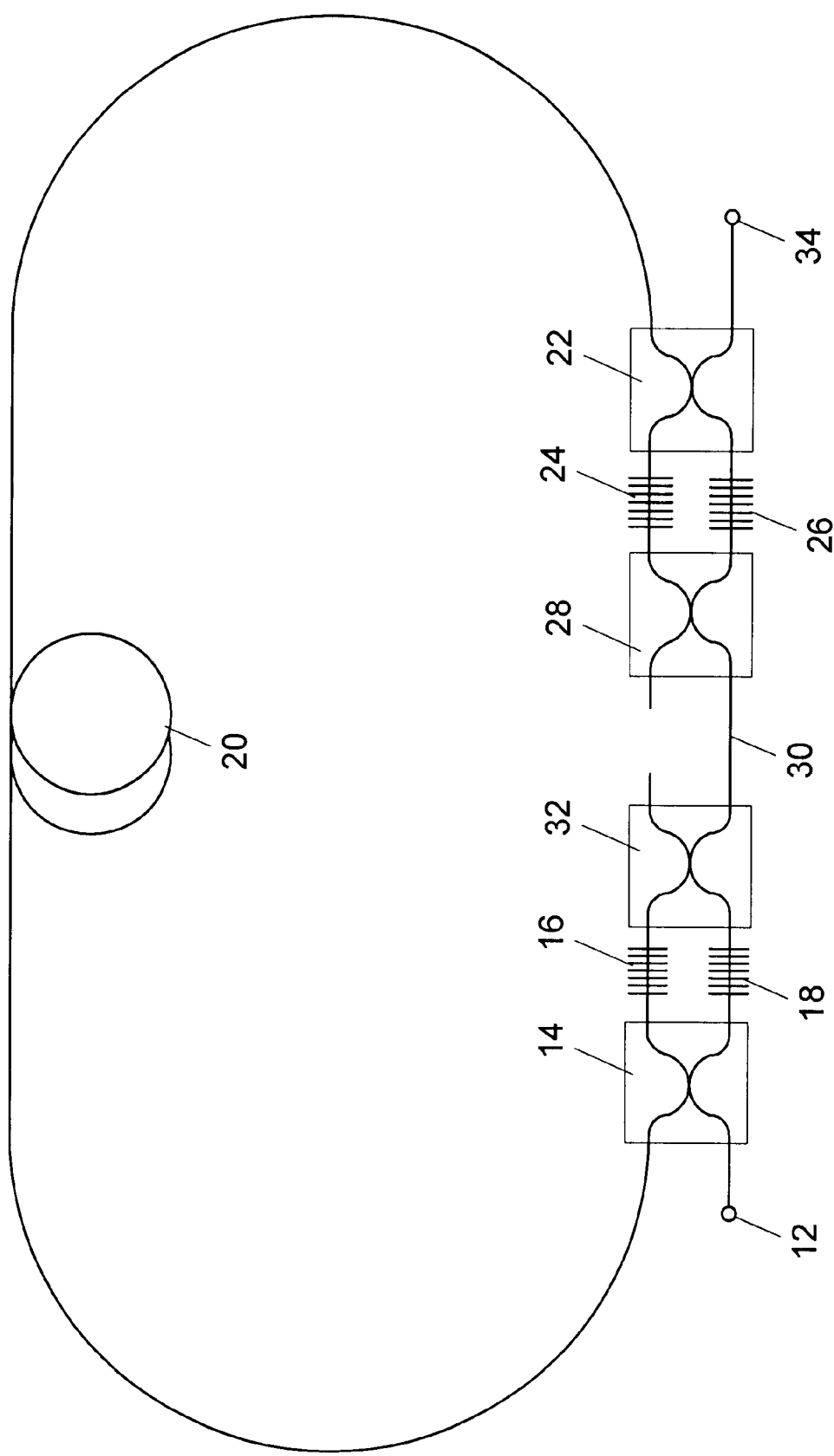
FIG. 1 is a schematic view of an optical gain apparatus using fused fiber couplers to introduce an input signal and collect an output signal.

Shown in FIG. 1 is a schematic view of an embodiment of the invention in which a Raman amplifier makes use of a ring configuration. An input signal at a wavelength of $\lambda_0$ is injected into a fiber ring via input port 12. The light at the input port 12 is coupled into the system by a fused fiber coupler 14 that, in the present embodiment, is a 3 dB or "50/50" coupler. That is, the $\lambda_0$ light is split roughly equally between the two fibers of the coupler, with each portion being directed toward one of fiber Bragg gratings 16, 18. However, as described below, the coupler separates the light by relative phase shift, allowing appropriate use of the couplers to direct the light as desired.

Figure 1A:
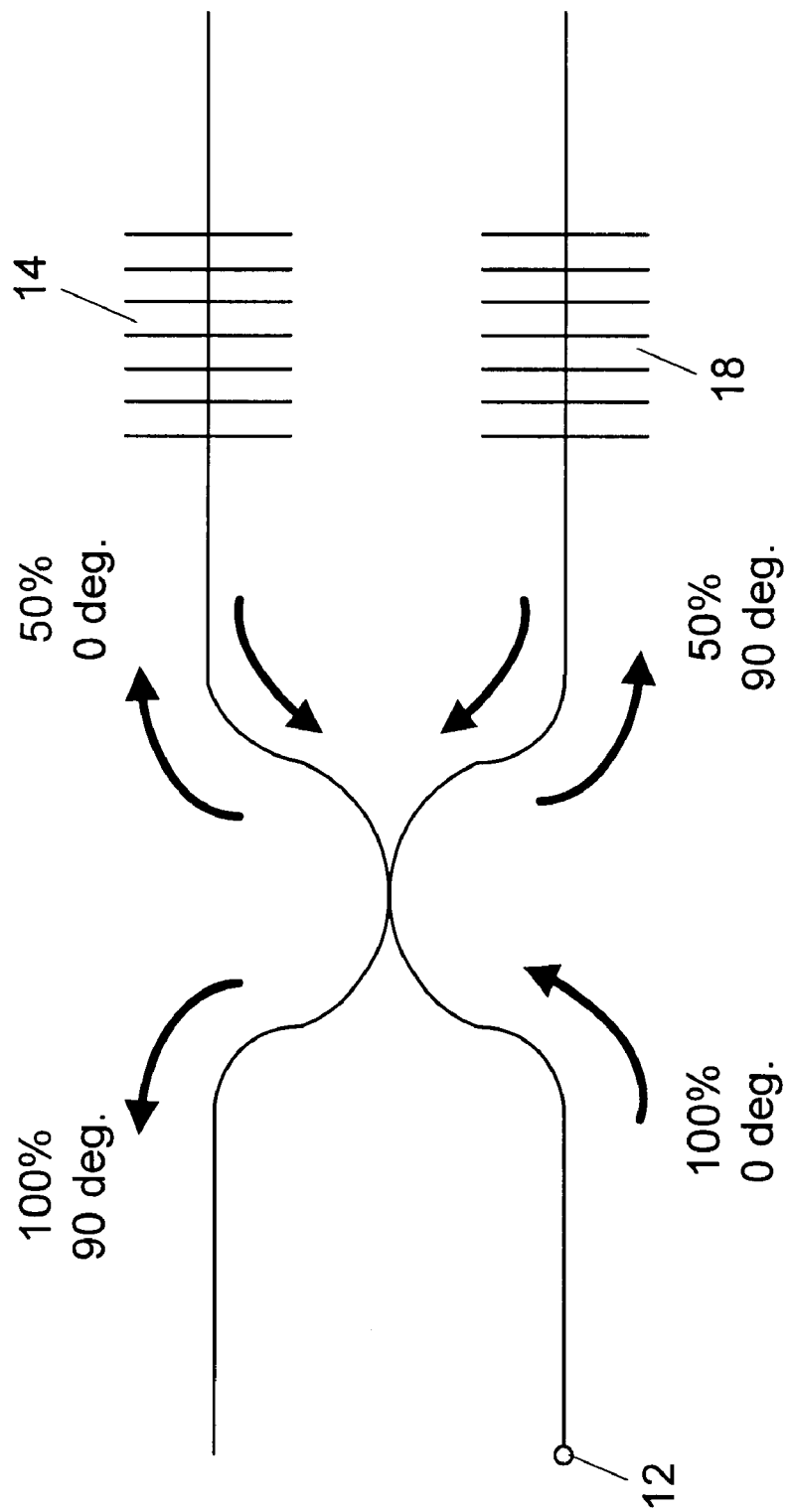
FIG. 1A is a schematic view of a portion of a fused fiber coupler as used with the embodiment of FIG. 1, showing different coupling paths and signal phases.

FIG. 1A shows an isolated view of the coupler 14 of FIG. 1, with arrows indicating the relative portions of light entering and exiting the coupler. The light is initially coupled into the input port 12, and that input branch is therefore labeled in the figure as "100%–0 deg." This label indicates that 100% of the light is input to the coupler along this branch and that it has a relative phase shift of zero. Those skilled in the art will recognize that the absolute phase shift of the light in this context is irrelevant, provided that the relative phase shift is known. This initial light is therefore arbitrarily identified as having a phase shift of zero degrees. As the light passes through the coupler 14, it is divided into two portions roughly equal in power. As shown in FIG. 1A, one of these portions is directed into the opposite fiber than that containing port 12, and maintains the same relative phase. This is therefore identified in the figure by the label "50%–0 deg." However, as is known in the art of such fiber couplers, the portion of the light that passes through the coupler, but stays in the same fiber as contains port 12, undergoes a 90° phase shift, and therefore exits the coupler with a relative phase (relative to the input signal) of 90°. This is identified in the figure by the label "50%–90 deg."

Each of gratings 16, 18 is highly reflective at the input wavelength $\lambda_0$. Thus, each portion of light exiting the coupler 14 toward the gratings 16, 18 is reflected back toward the coupler 14 by its respective grating. The relative phase shift of these two portions is maintained, such that the two light portions reenter the coupler at a 90° phase shift relative to each other. The light portion reflected from grating 16 reenters the coupler, and the portion of it that is coupled into the same fiber as contains grating 16 enters the ring, and is subject to a 90° phase shift. If any portion of the light were to be coupled into the other fiber (i.e., toward input port 12), no additional phase shift would be introduced. As for the light reflected from grating 18, it reenters the coupler, and that portion of the light that crosses over to the other fiber is not subject to any additional phase shift. As such, this light is in phase with the light reflected from grating 16, and enters the ring. Any portion of the light reflected from grating 18 that would stay within the same fiber upon reentering the coupler 14 (i.e., and be directed back toward input port 12), would be subjected to an additional phase shift of 90°. Thus, the overall phase shift of any such light relative to the original input signal would be 180°.

From the description above, it can be seen that light that might be reflected from grating 16 and directed back toward the input port 12 would be 180° out of phase with the light that might be reflected from grating 18 and directed toward input port 12. Thus, the two portions have a canceling effect on each other, the result of which is that no light reflected from either of the gratings 16, 18 is redirected through the coupler along the path containing input port 12. As such, substantially all of the input light is reflected by gratings 16, 18 into the ring, albeit at a phase shift of 90° relative to the light input at port 12. This is indicated in FIG. 1A by the label "100%–90 deg." located adjacent to an arrow indicating the coupling of light into the ring.

The light coupled into the ring from coupler 14 enters gain medium 20, as shown in FIG. 1. Although gain medium 20 is shown as a separate coil of fiber in the figure, those skilled in the art will recognize that the entire ring may have the capacity to provide gain to the input light. In the preferred embodiment, the gain is provided via SRS, as the input light is shifted to higher wavelengths. An example of an appropriate gain medium 20 is a single mode fiber that is highly doped with germanium ($Ge^{3+}$), and is of relatively long length (e.g., 500–1000 meters long). The light passing through the ring reaches coupler 22, which is of essentially the same construction as coupler 14.

Here the light passes through the coupler, and is divided between the two output fibers at the opposite side of the fiber, and subjected to the resultant phase shifts.

Diffraction gratings 24, 26 are located in the signal paths to one side of the coupler 22. In the preferred embodiment, each of these gratings is the same, and has a reflectivity centered about a desired output wavelength of the device. Other wavelengths pass through the gratings unreflected. For the light entering the coupler 22, the portion exiting through the same fiber as that from which it entered the ring (i.e., the fiber containing grating 24), undergoes a 90° phase shift. The light that crosses over to the other fiber (i.e., the fiber containing grating 26) maintains the original phase. Any light that is not reflected by gratings 24, 26 passes through to fused fiber coupler 28, to which is connected fiber connection 30.

The portion of light passing from grating 24 to fiber 30 does not undergo an additional phase shift, but maintains the 90° phase shift relative to the light entering coupler 22. The portion of light passing from grating 26 to fiber 30 was not shifted in phase by coupler 22, but undergoes a 90° phase shift when it passes through coupler 28. Thus, the light from grating 26 is in phase with the light from grating 26 as it enters fiber 30, and is constructively added. However, light from grating 24 that might pass through to the other signal path of the coupler 28 would be 180° out of phase with light from grating 26 that was to pass over to that signal path. That is, light from grating 24 would be subjected to an additional 90° phase shift, giving it a total phase of 180° relative to the light entering coupler 22. Meanwhile, light from grating 26 would have no additional phase shift, and would therefore remain unshifted in phase relative to the light entering coupler 22. As such, all of the light entering coupler 28 exits into fiber 30, since the opposite port suffers from an opposite phase condition that results in a totally destructive interference effect.

From the above description, it will be apparent to those skilled in the art that, when two fused couplers of this type are connected one to the other, and light is coupled into one port of one of the couplers, it will all exit from a single port of the other coupler. More particularly, if the two 3 dB couplers are viewed as two fibers fused at two points, the phase shifting provided by the couplers results in light coupled into a first coupler via a first fiber to exit a second coupler into the opposite fiber. Thus, light entering coupler 22 via the port connected to the gain medium 20, exits into the fiber 30, albeit with a phase shift of 90°. Moreover, light in the fiber 30, all having the same relative phase, passes through fused fiber coupler 32, is separated between the paths passing through gratings 16, 18, and is recombined at the port of coupler 14 that connects to gain medium 20. Specifically, the light passing from fiber 30 through grating 18 undergoes a 90° phase shift in coupler 32, but no phase shift as it passes through coupler 14 back into the ring. The light passing from fiber 30 through grating 16, however, undergoes no phase shift in coupler 32, but undergoes a 90° phase shift as it passes through the coupler. 14. The opposite phase condition at the port of coupler 14 leading to input port 12 prevents any of this light from being coupled out in that direction.

Given the construction shown in FIG. 1, input light at $\lambda_0$ is coupled into the ring as described above, and is progressively shifted upward in wavelength through various Stokes levels until a desired output wavelength $\lambda_0$ is reached. This is the wavelength at which the reflectivity of gratings 24, 26 is centered. Assuming the output wavelength is more than one Stokes shift longer than the input wavelength, the system will operate as a cascaded Raman resonator. Thus, by the time the Raman-shifted wavelength $\lambda_n$ is reached by the light circulating in the ring, it enters the coupler 22, and is divided into two portions, one directed toward grating 24 and one directed toward grating 26. Due to the nature of the coupler, the portion of light directed toward grating 26 is not shifted in phase. However, the light directed toward coupler 24 is shifted 90°. The $\lambda_n$ light is reflected by both grating 24 and grating 26, and reenters coupler 22. Light directed toward output port from grating 24 retains its 90° phase shift, but is not further shifted in phase as it passes through the coupler. The light directed to port 34 from grating 26 undergoes a 90° phase shift, such that it is in phase with the light from grating 24. However, the light from grating 24 that would be redirected toward the gain medium 20 from coupler 22 would undergo a second phase shift, and would therefore be 180° out of phase relative to the light that would return to that same port from grating 26. As such, a cancellation condition exists in that direction, and all of the light reentering the coupler is output via port 34.

The arrangement of FIG. 1 allows for Raman-shifted gain over a predetermined number of Stokes levels. For example, with an input wavelength $\lambda_0$=1117 nm (at which the gratings 16, 18 would have their peak reflectivity), and gratings 24, 26 having a peak reflectivity at $\lambda_n$=1480 nm, the system would function as a cascaded Raman resonator, and would shift from the 1117 nm input wavelength through intermediate Stokes levels at 1175 nm, 1240 nm, 1315 nm and 1395 nm until ultimately reaching the desired output wavelength of 1480 nm. It will be understood that it is not necessary that $\lambda_n$ be at any particular Stokes order. The selectivity of gratings 24 and 26 may be used to select the desired output wavelength. For example, given an input wavelength $\lambda_0$ of 1117 nm, an output wavelength $\lambda_n$ may be selected at the third order of 1315 nm, or even the first order of 1175 nm, by choosing the wavelength selectivity of the gratings 24, 26. Indeed, any desired wavelength within the range of the gain medium 18 may be output by proper selection of the input wavelength $\lambda_0$ and the wavelength selectivity of gratings 16, 18, 24, 26.

Figure 2:
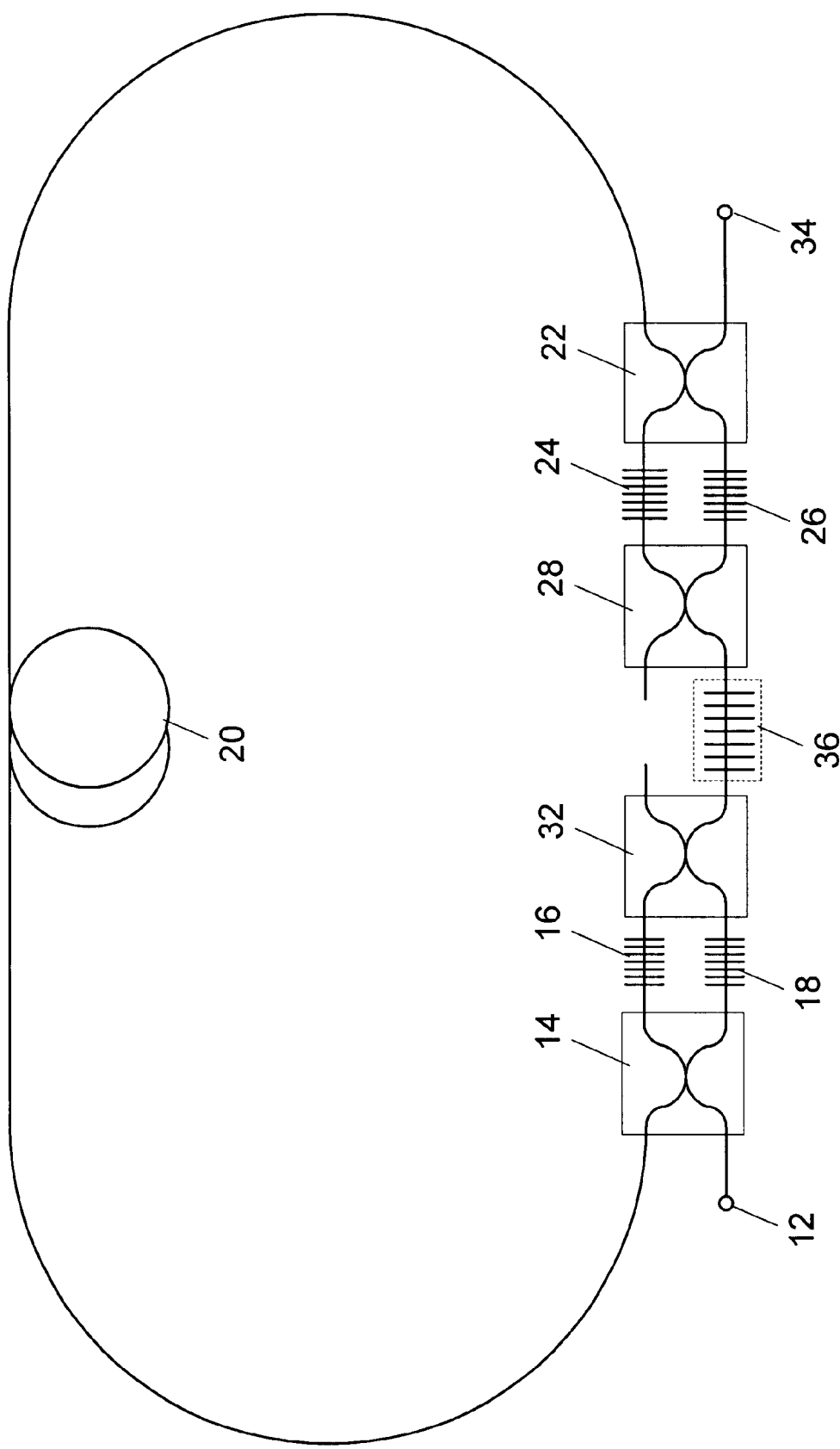
FIG. 2 is a schematic view of an embodiment similar to that of FIG. 2 in which one or more reflectors are used in the system to redirect light and/or select desired wavelengths.

Shown in FIG. 2 is an alternative embodiment of the invention having essentially the same structure as that shown in FIG. 1, except that an additional grating set is provided. Grating set 36 is located in fiber 30 and, in the preferred embodiment, includes highly reflective diffraction gratings at each of the wavelengths of the intermediate Stokes orders. For example, using wavelengths from the example described above, the grating set would include wavelengths at each of 1175 nm, 1240 nm, 1315 nm and 1395 nm. Use of this grating set would ensure that the tuning of the system for each of the Stokes orders would be at the desired wavelengths, since the grating set would act to select each of those wavelengths for resonance through the system. Although, in the system of FIG. 1, the input wavelength would step progressively through Stokes wavelengths, the use of the gratings 36 in FIG. 2 makes the selection of those intermediate wavelengths more precise, and helps to minimize wavelength drift. In the preferred embodiment, the gratings are combined together in a single grating structure having the desired selectivity peaks. However, those skilled in the art will recognize that multiple discrete gratings may also be used.

In another embodiment associated with FIG. 2, the grating set 36 could contain a single grating having a peak reflectivity at $\lambda_n$ that is located so as to reflect counter-clockwise (relative to the orientation of the figure) optical energy at $\lambda_n$. With a grating located in this fashion, any optical energy that was generated in the ring at $\lambda_n$ in the counter-clockwise direction would be reflected back in the clockwise direction, and would therefore follow the appropriate route to output port 34, as described above in conjunction with FIG. 1.

Figure 3A:
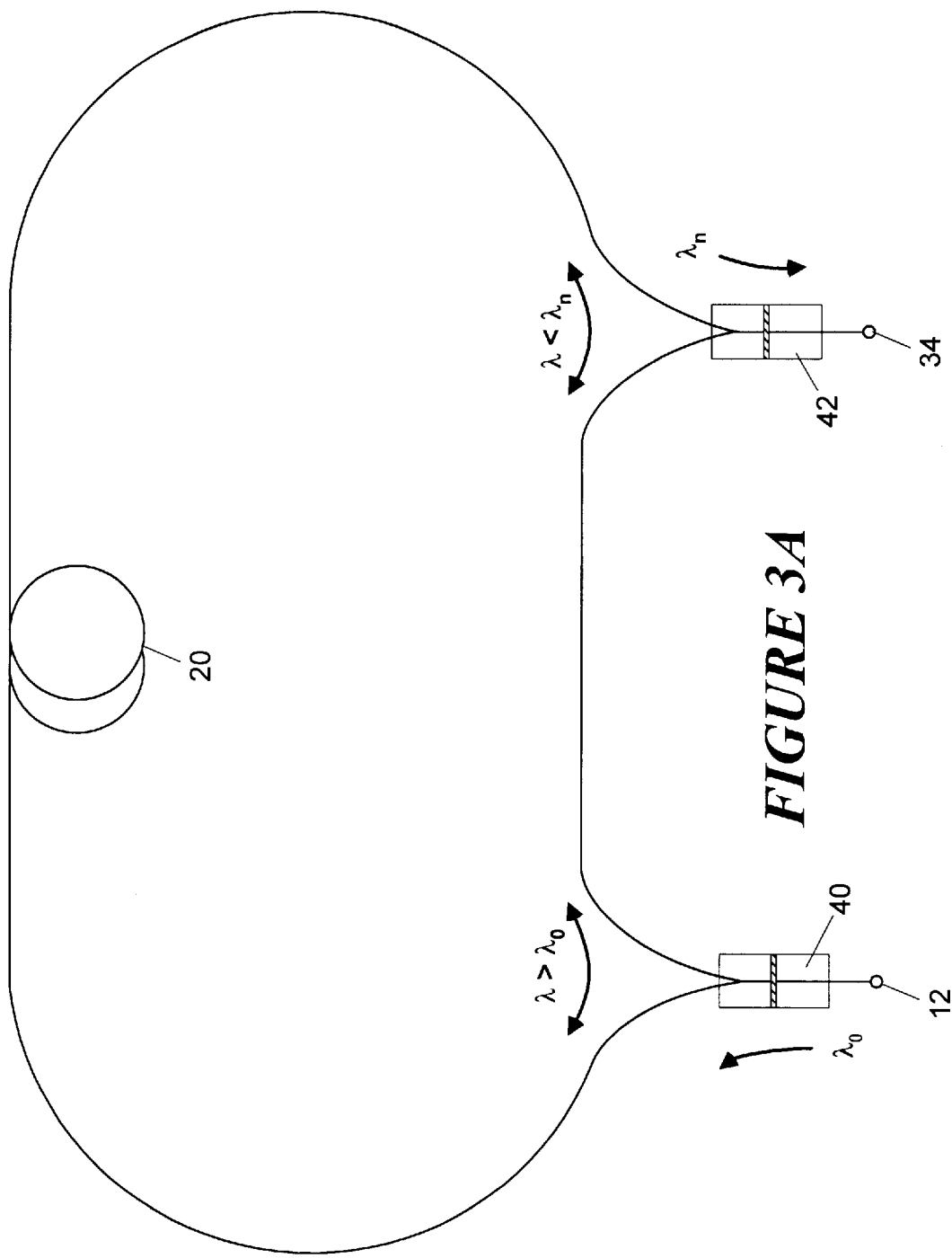
FIG. 3A is a schematic view of an alternative embodiment of the system that uses thin film type input and output couplers via which input and output wavelengths are transmitted through the couplers into and out of an optical ring, respectively.

FIG. 3A shows another embodiment of the invention in which a Raman gain medium 20 is used to amplify an input signal. The signal is input via input port 12, and is directed to input coupler 40. The coupler 40 is a wavelength selective input coupler having a "low pass" filter characteristic, in a wavelength sense. That is, it passes shorter wavelengths, while rejecting longer ones. The wavelength cutoff for filter 40 is set to accept wavelengths at the input signal wavelength and shorter, while rejecting the first Stokes order wavelength of the input signal and higher. That is, the cutoff must be at a wavelength long enough to accept the input signal, but short enough to reject the next Raman-shifted wavelength. For example, if the input signal had a wavelength of 1117 nm, the first Raman order would be at a wavelength of 1175 nm. Therefore, a cutoff wavelength of about 1150 nm, for example, would allow the unimpeded input of the signal $\lambda_0$, while preventing the 1175 nm wavelength from exiting toward the ring toward input port 12.

Like input coupler 40, output coupler 42 is also wavelength selective. However, the output coupler 42 has a "high pass" type filter characteristic, such that it passes longer wavelengths to output port 34, while maintaining shorter wavelengths in the ring. The cutoff wavelength of the filter 42 is set so as to allow the unimpeded passing of the output signal $\lambda_n$, while not coupling out any shorter wavelengths. This cutoff wavelength could therefore be, for example, in the vicinity of a midpoint between the output wavelength and the next lowest Raman order. For example, if $\lambda_n$=1480 nm, than the next lowest Raman order would be 1395 nm. Thus, an appropriate cutoff wavelength for the filter might be at about 1440 nm. In this configuration, the input signal would enter the ring, and propagate through it, undergoing progressive Raman shifts, until it reached the cutoff wavelength of the output coupler. At this wavelength, the optical energy would be transmitted through the filter element of the output coupler 42, and exit as an output signal directed to output port 34.

In one embodiment of the invention, the wavelength selective couplers of FIG. 3A each make use of a thin film filter type coupler. Such devices are known in the art, and provide coupling of light that is wavelength selective relative to a cutoff wavelength. Typically, these couplers have a filter component that is reflective to wavelengths above or below a particular cutoff wavelength. The filter component has graded index (GRIN) lenses to either side of it to allow coupling into and out of the appropriate optical fibers. Optical energy that enters the coupler through a first fiber, and is reflected by the filter, is directed to a different fiber by a GRIN lens.

In the configuration of FIG. 3A, the wavelengths between the cutoff wavelengths of the input coupler 40 and the output coupler 42, respectively, continue to propagate through the ring. The wavelength selective element of the coupler 40 is reflective to wavelengths above a wavelength in the range of $\lambda_0$, thus allowing the transmission of an input signal from input port 12 into the ring, while providing reflection of higher Stokes orders, so that they are maintained in the ring. This wavelength characteristic is indicated in the figure by the arrow showing $\lambda_0$ being coupled into the ring, and the double-headed arrow indicating that wavelengths longer than the input wavelength (i.e., $\lambda>\lambda_0$) are reflected by the coupler 40 back into the ring. Similarly, the wavelength selective element in coupler 42 is reflective to wavelengths below a wavelength in the range of $\lambda_n$, thus allowing the coupling out of the desired output wavelength, while maintaining lower Stokes orders in the ring. This wavelength characteristic is indicated in the figure by the arrow showing $\lambda_n$ being coupled out of the ring, and the double-headed arrow indicating that wavelengths shorter than the output wavelength (i.e., $\lambda<\lambda_n$) are reflected by coupler 42 back into the ring.

Figure 3B:
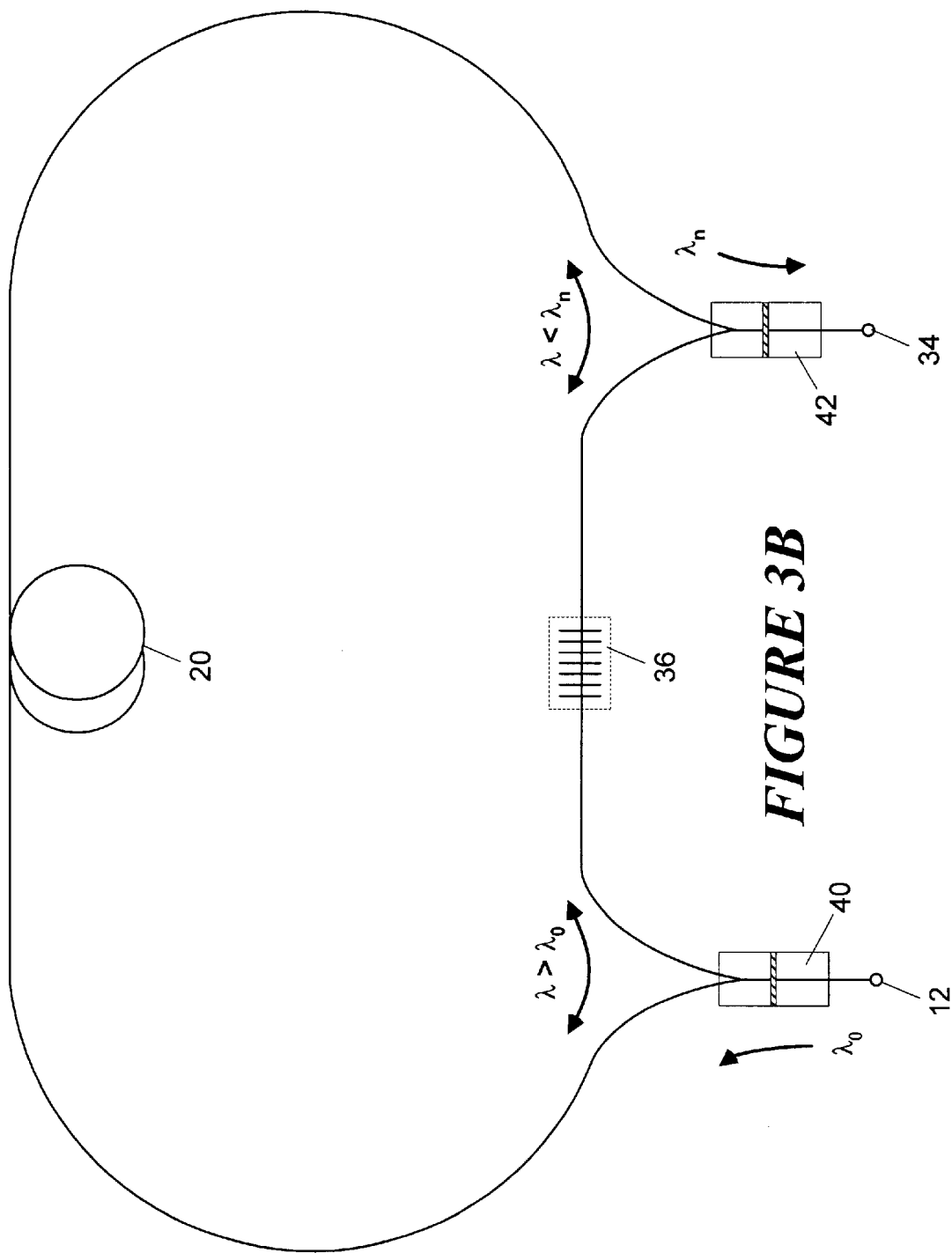
FIG. 3B is a schematic view of an embodiment similar to that of FIG. 3A in which one or more reflectors are used in the system to redirect light and/or select desired wavelengths.

Shown in FIG. 3B is an embodiment similar to that of FIG. 3, using similar wavelength selective input and output couplers 40 and 42. In fact, the configuration of the FIG. 3B embodiment is the same as that of FIG. 3A except for the use of grating set 36. As in FIG. 2, the grating set 36 may include highly reflective diffraction gratings at each of the wavelengths of the intermediate Stokes orders. Again, use of this grating set ensures that the tuning of the system for each of the Stokes orders would be at the desired wavelengths, since the grating set would act to select each of those wavelengths within the system. For example, gratings of grating set 36 in the FIG. 3B embodiment might include each of 1175 nm, 1240 nm, 1315 nm and 1395 nm, given an input wavelength of 1117 nm. Use of the grating set makes the selection of these intermediate wavelengths more precise, helping to minimize wavelength drift.

Figure 4A:
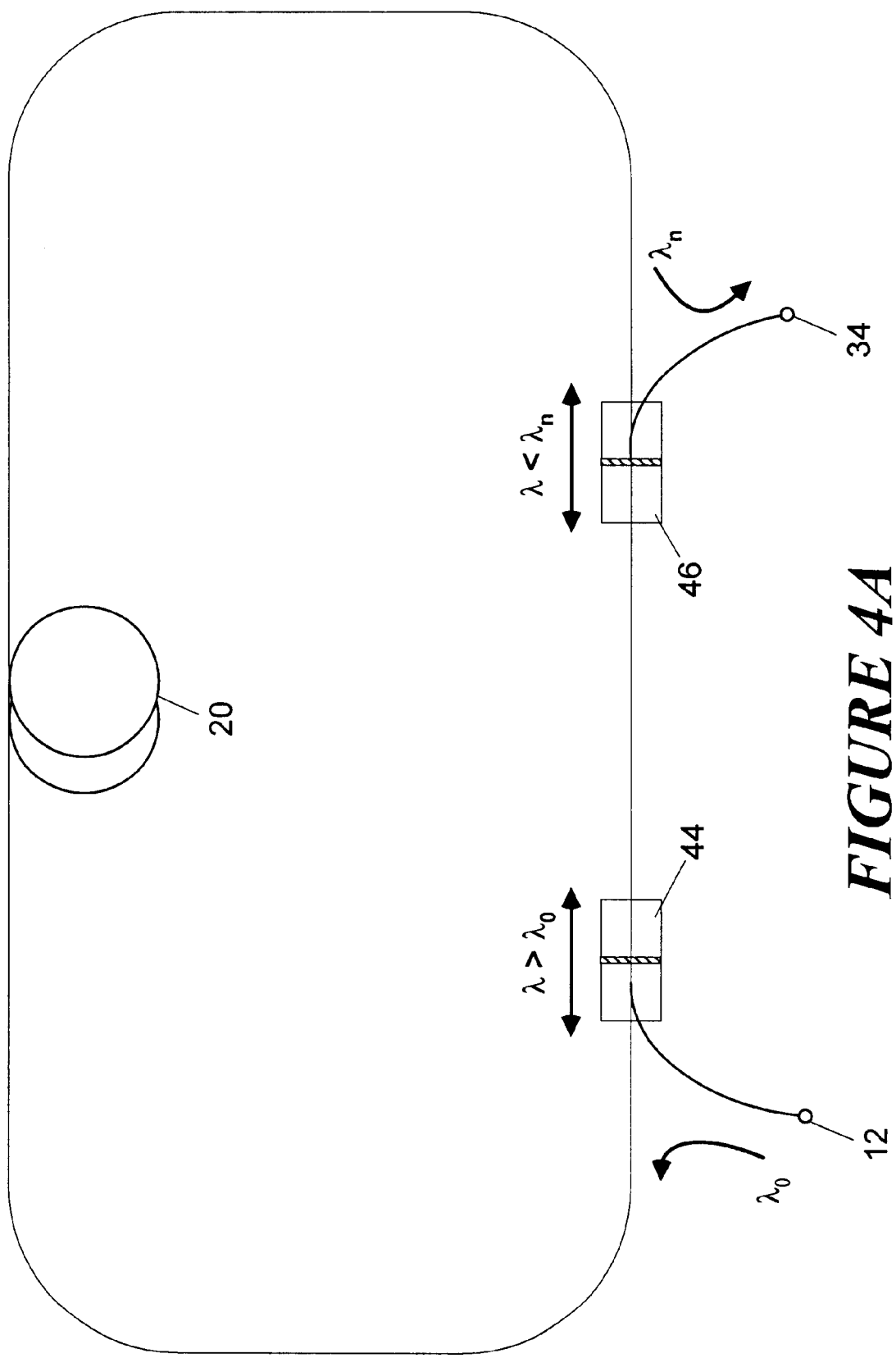
FIG. 4A is a schematic view of another embodiment of the invention in which thin film type input and output couplers are again used, but in which the couplers are such that the input and output wavelengths are reflected into and out of an optical ring, respectively.

The embodiment of FIG. 4A is similar to that of FIG. 3A, except that thin film type couplers 44 and 46, used as input and output couplers, respectively, have filter characteristics that allow input and output signals to be reflected by them into the ring, rather than transmitted through them. The couplers 44, 46 are similar to couplers 40, 42 of the FIG. 3A embodiment, except that different filter elements allow them to be used in a different configuration. In the case of coupler 44, the wavelength selective element of the coupler reflects wavelengths at and below a wavelength of $\lambda_0$. Thus, an input signal directed from input port 12 is reflected into the ring by the wavelength selective element of the coupler, while higher Stokes orders in the ring pass through the coupler, remaining within the ring. This is indicated in the figure by the arrow showing $\lambda_0$ being coupled into the ring, and the double-headed arrow showing wavelengths above the input wavelength (i.e., $\lambda > \lambda_0$) passing through the coupler and remaining in the ring. Similarly, the coupler 46 has a wavelength selective element that is reflective for wavelengths at and above a wavelength in the range of output wavelength $\lambda_n$. This is indicated in the figure by the arrow showing $\lambda_n$ being coupled out through coupler 46 to output port 34, and by the double-headed arrow showing wavelengths lower than the output wavelength (i.e., $\lambda < \lambda_n$) passing through the coupler and remaining in the ring.

Figure 4B:
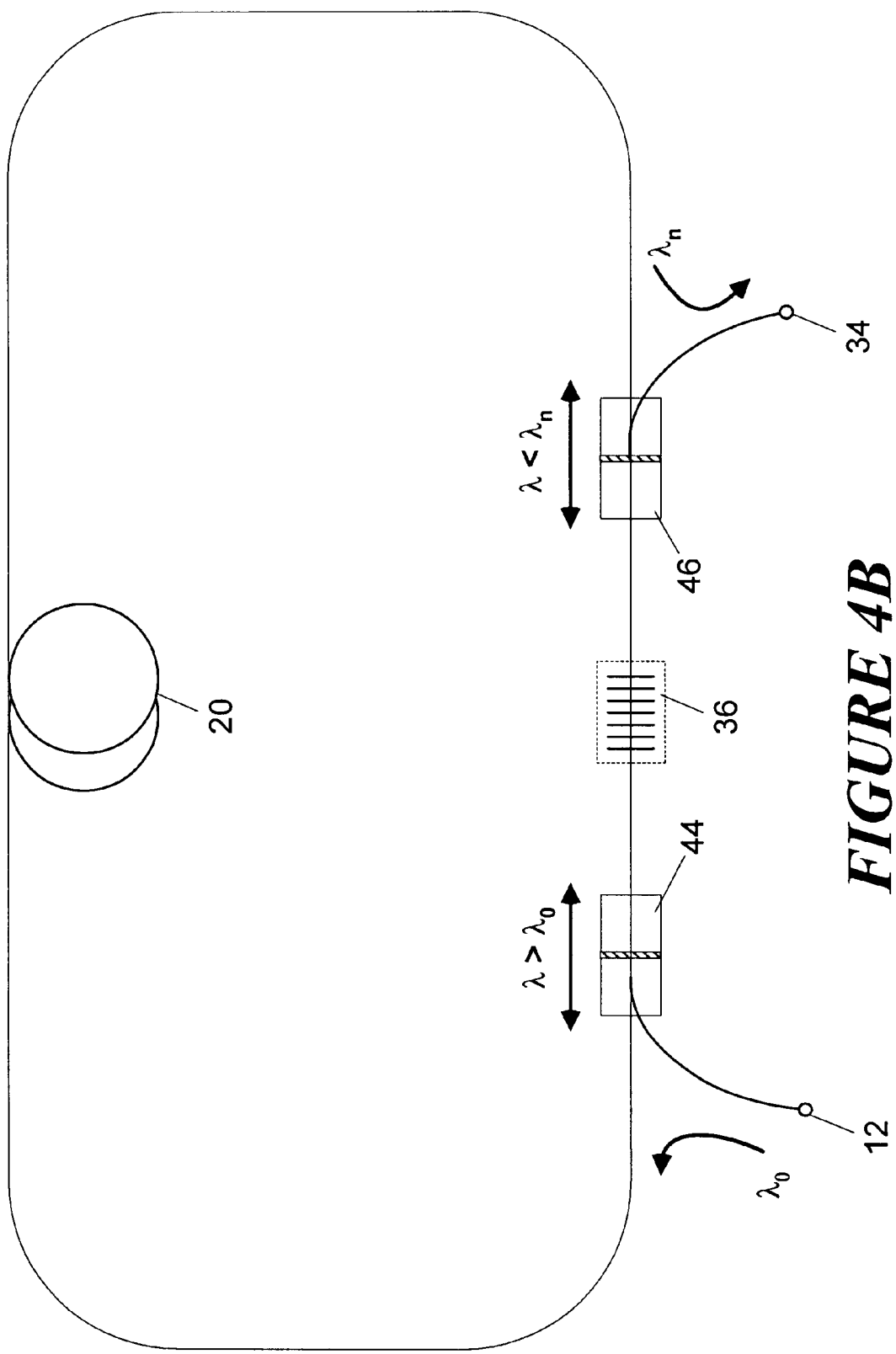
FIG. 4B is a schematic view of an embodiment similar to that of FIG. 4A in which one or more reflectors are used in the system to redirect light and/or select desired wavelengths.

The embodiment of FIG. 4B is similar to the embodiment of FIG. 4A except that grating set 36 is used to select the desired intermediate Stokes wavelengths. Again, gratings of grating set 36 in the FIG. 4B embodiment might include each of 1175 nm, 1240 nm, 1315 nm and 1395 nm, given an input wavelength of 1117 nm. Alternatively, the grating set 36 could contain a single grating having a peak reflectivity at $\lambda_n$ that is located so as to reflect counter-clockwise (relative to the orientation of the figure) optical energy. With a grating located in this fashion, any optical energy that was generated in the ring at $\lambda_n$ in the counter-clockwise direction would be reflected back in the clockwise direction, and would therefore be traveling the correct direction to allow it to be coupled out of the ring via coupler 46.

Yet another embodiment of the invention is shown in FIG. 5. In this embodiment, a thin film type coupler 50 is again used. However, the coupler 50 provides both the input and the output coupling for the ring. The coupler has an input path connected to it in one direction, and has an output path connected to it from an opposite direction. A wavelength selective component in the coupler 50 has two wavelength selective coatings, one on either side of it. On one side is a coating that is reflective at wavelengths at and below a wavelength in the range of $\lambda_0$, such that the input wavelength from input port 12 is reflected by the coupler 50 into the ring. On the other side is a coating that is reflective at wavelengths at and above a wavelength in the range of the output wavelength $\lambda_n$. This characteristic is indicated by the two arrows showing $\lambda_0$ being coupled from input port 12 into the ring and $\lambda_n$ being coupled from the ring to output port 34, and by the double-headed arrow showing wavelengths in between (i.e., $\lambda_0 < \lambda < \lambda_n$) passing through the coupler and remaining in the ring.

Figure 5A:
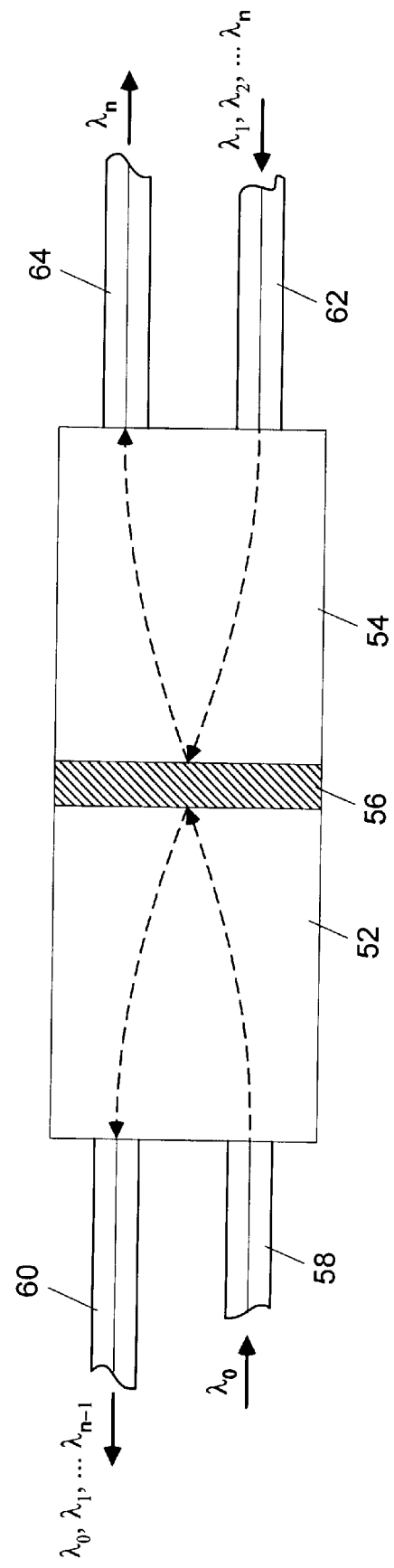
FIG. 5A is a schematic view of an optical coupler like that used in the embodiment of FIG. 5.

A coupler structure that may be used for the coupler 50 of the FIG. 5 embodiment is shown in FIG. 5A. Two GRIN lenses in the coupler are separated by filter element 56. This filter element has, on a first side, a material (such as a coating on one side of the element 56) that is reflective to wavelengths at or below the input wavelength $\lambda_0$. Thus, the wavelength selective material reflects light directed into the coupler along input path 58 into path 60, but does not interfere with longer wavelength passing through the coupler filter element 56. The wavelength selective component 56 also includes a material (such as a second coating on a side of the filter element 56 opposite the first coating) that is reflective to wavelengths at or above the output wavelength $\lambda_n$. Thus, light that reaches the coupler, for example, along path 62 has any components at the output wavelength $\lambda_n$ reflected to output path 64. Meanwhile, light at intermediate wavelengths (i.e., $\lambda_1, \lambda_2, \ldots \lambda_{n-1}$) pass through the wavelength selective component 56 into path 60.

While the structure shown in FIG. 5 is useful for a ring-based Raman amplifier, as discussed above, those skilled in the art will recognize that this configuration may be used for other devices as well. The coupler provides a means to segregate wavelengths above and below a particular wavelength range, and direct them in and/or out along desired paths. It therefore has application beyond the specific Raman amplifier embodiments shown herein.

While the invention has been shown and described with reference to a preferred embodiment thereof, it will be apparent to those skilled in the art that various changes in form and detail may be made herein without departing from the spirit and scope of the invention as defined by the appended claims.

What is claimed is:

1. An optical gain apparatus comprising:
   an optical gain medium that generates optical gain when pumped with optical pump energy at a pump wavelength;
   a plurality of wavelength insensitive power-splitting couplers, each having two signal paths on each of a first side and a second side, such that signals directed to the coupler along first and second paths to the first coupler side can exit the coupler along third and fourth paths to the second coupler side, a first coupler having a first path coupled to an input port and a second path coupled to a first optical side of the gain medium, and a second coupler having a fourth path coupled to an output port and a third path coupled to a second optical side of the gain medium opposite the first side;
   first and second input reflectors located, respectively, in the third and fourth signal paths of the first coupler and each being wavelength selective so as to reflect a limited wavelength band including a predetermined input wavelength; and
   first and second output reflectors located, respectively, in the first and second signal paths of the second coupler and each being wavelength selective so as to reflect a limited wavelength band including a predetermined output wavelength, optical energy outside the predetermined output wavelength being directed to said first optical side of the gain medium.

2. An optical gain apparatus according to claim 1 further comprising third and fourth wavelength insensitive power-splitting couplers, the third coupler having its third and fourth signal paths coupled, respectively, so as to receive the optical energy outside of the predetermined output wavelength band that bypasses the first and second output reflectors, and its first signal path coupled to a fourth signal path of the fourth coupler, the first and second signal paths of the fourth coupler being coupled so as to direct optical energy toward a side of the first and second input reflectors opposite the first coupler.

3. An optical gain apparatus according to claim 1 wherein, in each coupler, optical energy entering through the first signal path and exiting through the third signal path undergoes a phase shift of 90°, while optical energy entering through the first signal path and exiting through the fourth signal path undergoes no phase shift.

4. An optical gain apparatus according to claim 1 further comprising a reflector located in the path of optical energy propagating in the optical gain apparatus, the reflector having a narrow wavelength reflection band around the output wavelength and being located to preserve a single propagation direction through the gain medium of optical energy at the output wavelength.

5. An optical gain apparatus according to claim 1 wherein the gain medium provides optical gain via stimulated Raman scattering.

6. An optical gain apparatus according to claim 5 wherein the output wavelength is a Raman-shifted wavelength relative to the input wavelength.

7. An optical gain apparatus according to claim 5 wherein the apparatus operates as a cascaded Raman resonator.

8. An optical gain apparatus according to claim 7 further comprising an intermediate reflector located in the path of optical energy propagating in the optical gain apparatus, the reflector having a relatively narrow wavelength reflection band around an intermediate Raman-shifted wavelength significantly longer than the input wavelength and significantly shorter than the output wavelength.

9. An optical gain apparatus according to claim 8 wherein the intermediate reflector is a first intermediate reflector, and wherein the gain apparatus further comprises at least one additional intermediate reflector, each intermediate reflector having a relatively narrow wavelength reflection band surrounding a different Raman-shifted wavelength.

10. An optical gain apparatus comprising:
an optical ring comprising an Raman gain medium that generates optical gain via stimulated Raman scattering when pumped with optical pump energy at a pump wavelength;
a wavelength selective input optical coupler via which optical energy at the pump wavelength is coupled into the optical ring, the input optical coupler being a non-fiber coupler and having an input cutoff wavelength such that wavelengths longer than the input cutoff wavelength are not coupled into the ring by the input coupler, while wavelengths shorter than the input cutoff wavelength are coupled into the optical ring, the pump wavelength being shorter than the input cutoff wavelength; and
a wavelength selective output optical coupler via which optical energy is coupled out of the optical ring, the output optical coupler being a non-fiber coupler and having an output cutoff wavelength such that wavelengths shorter than the output cutoff wavelength are not coupled out of the ring by the output coupler, while wavelengths longer than the output cutoff wavelength are coupled out of the optical ring.

11. An optical gain apparatus according to claim 10 wherein the input optical coupler comprises a thin film type coupler.

12. An optical gain apparatus according to claim 11 wherein the input optical coupler has a filter element via which wavelengths shorter than the input cutoff wavelength are reflected into the optical ring.

13. An optical gain apparatus according to claim 11 wherein the input optical coupler has a filter element through which wavelengths shorter than the input cutoff wavelength are transmitted into the optical ring.

14. An optical gain apparatus according to claim 10 wherein the output optical coupler comprises a thin film type coupler.

15. An optical gain apparatus according to claim 14 wherein the output optical coupler has a filter element via which wavelengths longer than the output cutoff wavelength are reflected out of the optical ring.

16. An optical gain apparatus according to claim 14 wherein the output optical coupler has a filter element through which wavelengths longer than the input cutoff wavelength are transmitted out of the optical ring.

17. An optical gain apparatus according to claim 10 wherein the input optical coupler and the output optical coupler are part of a single wavelength selective coupler.

18. An optical gain apparatus according to claim 10 further comprising a reflector positioned in the optical path of the optical ring, the reflector having a relatively narrow wavelength reflection band around an output wavelength and being located to preserve a single propagation direction through the gain medium of optical energy at the output wavelength.

19. An optical gain apparatus according to claim 10 further comprising an intermediate reflector located in the optical path of the optical ring, the reflector having a relatively narrow wavelength reflection band around an intermediate Raman-shifted wavelength that is significantly longer than the input cutoff wavelength and significantly shorter than the output cutoff wavelength.

20. An optical gain apparatus according to claim 19 wherein the intermediate reflector is a first intermediate reflector, and wherein the gain apparatus further comprises at least one additional intermediate reflector, each intermediate reflector having a relatively narrow wavelength reflection band surrounding a different Raman-shifted wavelength.

21. A method of generating optical gain, the method comprising:
providing an optical gain medium that generates optical gain when pumped with optical pump energy at a pump wavelength;
coupling optical energy at the pump wavelength to the optical gain medium with a first coupler having a first path coupled to an input port and a second path coupled to a first optical side of the gain medium, and coupling optical energy away from the gain medium with a second coupler having a fourth path coupled to an output port and a third path coupled to a second optical side of the gain medium opposite the first side, wherein each of the first and second couplers is a wavelength insensitive power-splitting coupler having two signal paths on each of a first side and a second side, such that signals directed to the coupler along first and second paths to the first coupler side can exit the coupler along third and fourth paths to the second coupler side;
reflecting optical energy with first and second input reflectors located, respectively, in the third and fourth signal paths of the first coupler, each of said input reflectors being wavelength selective so as to reflect a relatively narrow wavelength band around the pump wavelength; and
reflecting optical energy with first and second output reflectors located, respectively, in the first and second signal paths of the second coupler, each of said output reflectors being wavelength selective so as to reflect a relatively narrow wavelength band around a predetermined output wavelength, optical energy outside the predetermined output wavelength being directed to said first optical side of the gain medium.

22. A method according to claim 21 further comprising coupling the second coupler to the first coupler with third and fourth couplers, the third coupler having its third and fourth signal paths coupled, respectively, so as to receive the optical energy outside of the predetermined output wavelength band that bypasses the first and second output reflectors, and its first signal path coupled to a fourth signal path of the fourth coupler, the first and second signal paths of the fourth coupler being coupled so as to direct optical energy toward a side of the first and second input reflectors opposite the first coupler.

23. A method according to claim 21 wherein, in each coupler, optical energy entering through the first signal path and exiting through the third signal path undergoes a phase shift of 90°, while optical energy entering through the first signal path and exiting through the fourth signal path undergoes no phase shift.

24. A method according to claim 21 further comprising reflecting optical energy in the optical gain apparatus with a redirecting reflector, the redirecting reflector having a relatively narrow wavelength reflection band around the output wavelength and being oriented to preserve a single propagation direction through the gain medium of optical energy at the output wavelength.

25. A method according to claim 21 wherein the gain medium provides optical gain via stimulated Raman scattering.

26. A method according to claim 25 wherein the output wavelength is a Raman-shifted wavelength relative to the input wavelength.

27. A method according to claim 25 wherein the apparatus operates as a cascaded Raman resonator.

28. A method according to claim 27 further comprising reflecting optical energy in the apparatus with an intermediate reflector, the reflector having a relatively narrow wavelength reflection band around an intermediate Raman-shifted wavelength significantly longer than the input wavelength and significantly shorter than the output wavelength.

29. A method according to claim 28 wherein the intermediate reflector is a first intermediate reflector, and wherein the method further comprises reflecting optical energy with at least one additional intermediate reflector, each intermediate reflector having a relatively narrow wavelength reflection band surrounding a different Raman-shifted wavelength.

30. A method of providing optical gain, the method comprising:
    providing an optical ring comprising a Raman gain medium that generates optical gain via stimulated Raman scattering when pumped with optical pump energy at a pump wavelength;
    coupling optical energy at the pump wavelength into the optical ring with a wavelength selective input optical coupler, the input optical coupler being a non-fiber coupler and having an input cutoff wavelength such that wavelengths longer than the input cutoff wavelength do not pass through the coupler, while wavelengths shorter than the input cutoff wavelength are coupled into the optical ring, the input cutoff wavelength being shorter than the pump wavelength; and
    coupling optical energy out of the optical ring with a wavelength selective output optical coupler, the output optical coupler being a non-fiber coupler and having an output cutoff wavelength such that wavelengths shorter than the output cutoff wavelength do not pass through the coupler, while wavelengths longer than the output cutoff wavelength are coupled out of the optical ring.

31. A method according to claim 30 wherein the input optical coupler comprises a thin film type coupler.

32. A method according to claim 31 wherein the input optical coupler has a filter element via which wavelengths shorter than the input cutoff wavelength are reflected into the optical ring.

33. A method according to claim 31 wherein the input optical coupler has a filter element through which wavelengths shorter than the input cutoff wavelength are transmitted into the optical ring.

34. A method according to claim 30 wherein the output optical coupler comprises a thin film type coupler.

35. A method according to claim 34 wherein the output optical coupler has a filter element via which wavelengths longer than the output cutoff wavelength are reflected out of the optical ring.

36. A method according to claim 34 wherein the output optical coupler has a filter element through which wavelengths longer than the input cutoff wavelength are transmitted out of the optical ring.

37. A method according to claim 30 wherein the input optical coupler and the output optical coupler are part of a single wavelength selective coupler.

38. A method according to claim 30 further comprising reflecting optical energy with a reflector positioned in the optical path of the optical ring, the reflector having a relatively narrow wavelength reflection band around an output wavelength and being located to preserve a single propagation direction through the gain medium of optical energy at the output wavelength.

39. A method according to claim 30 further comprising reflecting optical energy with an intermediate reflector located in the optical path of the optical ring, the intermediate reflector having a relatively narrow wavelength reflection band around an intermediate Raman-shifted wavelength significantly longer than the input cutoff wavelength and significantly shorter than the output cutoff wavelength.

40. A method according to claim 39 wherein the intermediate reflector is a first intermediate reflector, and wherein the gain apparatus further comprises at least one additional intermediate reflector, each intermediate reflector having a relatively narrow wavelength reflection band surrounding a different Raman-shifted wavelength.

* * * * *